Reissued Feb. 18, 1941 Re. 21,720

UNITED STATES PATENT OFFICE 21,720

METHOD OF COLORING FRUIT

Jagan N. Sharma, Los Angeles, Calif., assignor to Food Machinery Corporation, San Jose, Calif., a corporation of Delaware No Drawing. Original No. 2,133,404, dated October 18, 1938, Serial No. 731,265, June 19, 1934. Application for reissue February 13, 1939, Serial No. 256,251

4 Claims. (Cl. 99—103)

This invention relates to an improved method of imparting a varietal coloration to citrus fruits.

As disclosed in Patent No. 1,909,860 issued to Rodney B. Harvey, citrus fruits vary in color but variations from the standard varietal color do not necessarily mean that the fruit is immature or of low quality. This patent, among other things, disclosed a method of enhancing the varietal color of citrus fruit by subjecting the fruit to the action of an oleaginous liquid containing a suitable dye or coloring substance. It has been found, however, that when some of the lighter mineral oils and distillates are used as a carrier for the dye or other coloring material, the fruit, although improved in color, has a tendency to shrink and wither.

The present invention is particularly directed to a method whereby the varietal color of citrus fruit (or other fruits provided with an oily and/or waxy outer skin or peel) may be enhanced without destroying or impairing the natural texture or appearance of the fruit and without causing the fruit to wither or dry and become wrinkled within a short period of time after treatment.

Generally stated, the present invention discloses certain materials and conditions and methods of application whereby the varietal color of fruit may be enhanced without the aforementioned undesirable effects.

Generally, my invention contemplates the formation of a waxy mixture or mass containing a dye or coloring substance which is preferentially soluble in the oily and waxy constituents of the skin or peel of the fruit. This waxy mixture is then applied to the fruit in a heated, finely divided or atomized form and the fruit then brushed thoroughly while being maintained at a temperature above the softening point of the waxy mixture, for the purpose of removing excess waxy substance, removing waxy material from the crevices and pits which characterize the surface texture of substantially all citrus fruits and for the purpose of permitting the dye or coloring substance to pass from the waxy carrier into the skin or peel. As a result, the fruit after treatment is suitably colored so that its natural varietal color is enhanced and at the same time the fruit is provided with a very thin, practically imperceptible film of waxy material which retards shrinkage, withering and decay of the fruit.

Another object is to disclose and provide a method of enhancing the varietal color of citrus fruit.

A further object is to disclose and provide a process whereby the varietal color of fruit may be enhanced without deleterious effect upon the fruit.

These and other objects, uses, advantages, modifications and adaptations of this invention will become apparent to those skilled in the art from the following detailed description of the preferred materials, conditions, and methods of treatment.

Although the subsequent description will particularly describe the adaptation of the invention to the treatment of citrus fruit, it is to be remembered that other fruits and vegetables provided with a skin or peel which contains oily and waxy constituents and which is of a substantially uniform color may be similarly treated.

In carrying out the invention, a suitable wax or waxy composition is reduced to liquid form and a coloring substance such as an organic dye, is mixed therewith. The waxy material may comprise paraffin wax or mixtures of paraffin wax with carnauba wax, beeswax and/or other waxes which are solid at normal atmospheric temperatures. The waxy mixture may contain a proportion of relatively heavy, substantially nonvolatile oil, such as a highly refined lubricating oil, medicinal petroleum oil, petroleum jelly, cottonseed oil, etc. Larger proportions of the liquid oils may be used when the wax is of a high melting point. Ordinarily, not more than about 25%–35% by weight of the mixture may consist of oil, it being understood that the oil may be totally absent.

The dye or coloring substance used should be oil-soluble and the dye may be soluble to some extent in the oils and waxes used. Those dyes which are more readily soluble in the natural oils and waxes occurring in the skins and peels of citrus fruit are preferred. As a matter of fact, the dye may be insoluble in the waxy composition.

In addition, the dye substance should be stable in the presence of the acids normally found in the skin or peel of the fruit and should not fade upon exposure to sunlight. The methylated aniline dyes, such as xylidine-diazo compounds, are eminently suitable for use in this composition. A dye constituted of methylated aniline plus azo-beta-naphthol or of aniline plus beta-naphthol-amine, or of ortho-toluidine plus beta-naphthol-amine, is satisfactory.

Moreover, the dyes should be in a state of very fine division, preferably passing a 200 mesh sieve. The mixture of waxy material or waxy carrier and dye substance may be accomplished in any suitable manner, as for example by trituration, passage of the mixture through colloid mills, or simply prolonged agitation while the waxy carrier is maintained in a liquid or fluid condition.

When the dye substance is practically insoluble in the waxy ingredients, the resulting mixture should assume the characteristics of a colloidal suspension. From about 1% to 20% of the dye can be thus incorporated into the waxy carrier. The dyes used should have a shade, color or tone adapted to enhance the natural varietal color of the fruit to which the composition is to be applied when the composition is spread in a very thin film. Deep red dyes with an orange tone may be used as these dye particles, upon dilution or thinning, produce a suitable Valencia orange coloration.

The resulting waxy composition may be sold as an article of commerce to packing houses wherein the composition is used in the following manner:

After the citrus fruits have been washed and cleaned in any suitable and customary manner, and if desired treated with a mold or decay-inhibiting material, they may be subjected to a moist or finely divided spray of the waxy, color-containing composition. In making this application, the waxy color-containing composition is heated to liquidity (the precise temperature varying with the melting point of the composition and ranging from 140° F. to 190° F.) and the liquid wax then atomized through suitable nozzles by the use of pressure. Through atomization or the formation of a very fine mist is desirable as only a very thin film of wax on the fruit should be produced. After this treatment, the fruit, together with their waxy coating, are passed into a chamber and subjected to the action of an atmosphere having a temperature sufficient to maintain the wax in a soft or fluid condition. Fruit entering this chamber will be found to have a spotted or speckled appearance because citrus fruits have a characteristically rough-textured surface or skin and the particles of dye tend to collect in the pits or crevices of the skin. While the fruit are maintained in the heated atmosphere, it will be found that the particles of dye tend to migrate from the waxy coating into the outer layer or layers of the skin or peel because the dye is preferably and selectively soluble in the natural oils of the skin. While the fruit is maintained in the heated atmosphere, it is subjected to a vigorous brushing by means of rolls and the like. Brushing apparatus similar to that used in cleaning citrus fruits is eminently suited for this purpose and need not be described in detail here, being well known to those skilled in the art. Practically the only modification needed in existing brushing equipment is the provision of a housing around the rolls through which heated air may be allowed to pass so as to maintain the fruit in the aforesaid heated atmosphere during the brushing operation.

During such brushing, excess quantities of waxy composition are removed from the fruit and the excess dye or coloring substance present in the pits or crevices of the surface is eliminated. The brushing should be continued until a minute, practically indiscernible film of wax remains on the fruit, whereupon the fruit is discharged from the rolls and permitted to cool. The fruit thus treated will be found to be uniformly colored, it being understood that by the term "uniformly colored," reference is had to a uniform distribution of the dye or coloring substance over the surface area of the fruit and not to actual uniformity of the total color of the fruit as natural fruit often vary in shade from portion to portion of the surface area.

Although the above is a preferred method of treating the fruit, the waxy color-containing composition may be reduced to the form of a liquid and permitted to spread as a thin film upon a body of water. Fruit which it is desired to coat may then be passed through such film whereupon it will be found that a thin but readily perceptible film of the waxy composition becomes distributed over the surface of the fruit. After the waxy composition has been applied to the surface of the fruit in this manner, the fruit is preferably subjected to the brushing operation described hereinabove, such brushing being preferably accomplished while the fruit is surrounded by a heated atmosphere.

All such changes and modifications as come within the scope of the appended claims are embraced thereby.

I claim:

1. A method of imparting an enhanced varietal coloration to citrus fruit which comprises forming a waxy mixture containing particles of coloring substance dispersed therein, the coloring substance being soluble in the oils and waxes of the skin or peel of the fruit, heating such mixture to fluidity, applying said waxy mixture to whole citrus fruit while in a heated finely divided state, and finally brushing the fruit while maintaining the fruit in an atmosphere at a temperature sufficient to soften the waxy mixture carried by such fruit, whereby the coloring substance is caused to pass from said waxy mixture into the skin or peel of the fruit.

2. A method of imparting an enhanced varietal coloration to citrus fruit which comprises forming a mixture of wax and a coloring substance soluble in the oils and waxes of the skin or peel of the fruit, applying said waxy mixture to whole citrus fruit while in the form of a mist, and then brushing the fruit while maintaining the fruit in an atmosphere at a temperature of between 140° F. and 180° F., the brushing being carried on until the excess wax is removed from pits or crevices of the skin or peel of the fruit and the coloring substance passes into the skin or peel of the fruit to impart a substantially uniform coloration to the fruit.

3. A method of imparting enhanced varietal coloration to citrus fruit which comprises forming a mixture of normally solid waxes and a dye of the methylated aniline type soluble in the oils and waxes of the skin or peel of citrus fruit, reducing such mixture to fluidity, spraying the fluid and heated mixture upon the surfaces of whole citrus fruit, then brushing the fruit while maintaining the fruit in an atmosphere at a temperature sufficient to maintain the waxy mixture soft and semi-fluid, whereby the dye will pass from said waxy mixture into the skin or peel of the fruit, and finally cooling the fruit.

4. A method of imparting an enhanced varietal coloration to whole citrus fruit which comprises adding from about 1% to about 20% by weight of a finely divided, solid, dye substance soluble in oils and waxes of the skin or peel of whole citrus fruit, to a normally solid waxy material, heating the mixture to fluidity, applying said mixture of fluid waxy material and solid dye substance to whole citrus fruit, and then brushing the fruit while maintaining the fruit in an atmosphere at a temperature of between about 140° F. and 180° F. for a period of time sufficient to remove excess waxy material from pits and crevices of the skin or peel of the fruit and permit the dye substance to pass into the skin or peel of the fruit to impart an enhanced varietal coloration thereto.

JAGAN N. SHARMA.